(12) United States Patent
Davis et al.

(10) Patent No.: US 9,683,153 B2
(45) Date of Patent: Jun. 20, 2017

(54) FREEZE CONDITIONING AGENTS UTILIZING CRUDE GLYCERIN AND FLOWBACK AND PRODUCED WATER

(71) Applicant: ECOLAB USA INC., St. Paul, MN (US)

(72) Inventors: Ronald V. Davis, Geneva, IL (US); Jing Wang, Aurora, IL (US); Stephen J. Blubaugh, Naperville, IL (US); Walter Gerlach, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 14 days.

(21) Appl. No.: 14/673,654

(22) Filed: Mar. 30, 2015

(65) Prior Publication Data

US 2016/0289522 A1    Oct. 6, 2016

(51) Int. Cl.
*C09K 3/18* (2006.01)
(52) U.S. Cl.
CPC ..................................... *C09K 3/18* (2013.01)
(58) Field of Classification Search
None
See application file for complete search history.

(56) References Cited

U.S. PATENT DOCUMENTS

| | | | |
|---|---|---|---|
| 4,426,409 A | 1/1984 | Roe | |
| 4,778,615 A | 10/1988 | Jeglic | |
| 5,079,036 A | 1/1992 | Roe et al. | |
| 5,891,225 A | 4/1999 | Mishra et al. | |
| 6,416,684 B1 | 7/2002 | Bloomer | |
| 6,589,442 B1 | 7/2003 | Wilson et al. | |
| 6,878,308 B2 | 4/2005 | Schilling | |
| 6,890,451 B2 | 5/2005 | Sapienza et al. | |
| 7,108,800 B2 | 9/2006 | Tran et al. | |
| 7,398,935 B2 | 7/2008 | Tran et al. | |
| 2005/0087720 A1 | 4/2005 | Samuels et al. | |
| 2008/0085846 A1 | 4/2008 | Tran et al. | |
| 2008/0128125 A1 | 6/2008 | Fullerton | |
| 2008/0176770 A1 | 7/2008 | Sanders et al. | |
| 2009/0127499 A1 | 5/2009 | Tran et al. | |
| 2010/0021557 A1 | 1/2010 | Li et al. | |
| 2010/0048730 A1 | 2/2010 | Li et al. | |
| 2010/0163230 A1 | 7/2010 | Kotlar et al. | |
| 2011/0180263 A1 | 7/2011 | Mothersbaugh et al. | |
| 2011/0180422 A1 | 7/2011 | Mothersbaugh et al. | |
| 2012/0052134 A1 | 3/2012 | Li et al. | |
| 2012/0118579 A1 | 5/2012 | Murray et al. | |
| 2012/0152816 A1 | 6/2012 | Kennedy et al. | |

(Continued)

OTHER PUBLICATIONS

Pam Boschee, Produced and Flowback Water Recycling and Reuse Economics, Limitations, and Technology, Oil and Gas Facilities, pp. 16-22 (Feb. 2014).

(Continued)

*Primary Examiner* — Erma Cameron
(74) *Attorney, Agent, or Firm* — Kagan Binder, PLLC (57) ABSTRACT

The invention provides methods and compositions for freeze conditioning particulating materials. The invention includes the use of the combination of crude glycerin with flowback or produced water. This combination prevents unwanted agglomeration when frozen. This combination also is non-corrosive and best of all facilitates the safe clean recycling of what would otherwise be unwanted dangerous waste material.

13 Claims, 2 Drawing Sheets

(56) References Cited

U.S. PATENT DOCUMENTS

2014/0096971 A1* 4/2014 Keizer .................. E21B 37/06
166/308.2
2015/0275071 A1* 10/2015 Chen ..................... C09K 8/805
507/263

OTHER PUBLICATIONS

Daniel Flynn, The Nalco Water Handbook (3rd Edition), McGraw Hill (2009), pp. 6.1-8.30.
Haluszczak, et al., "Geochemical evaluation of flowback brine from Marcellus gas wells in Pennsylvania, USA", Oct. 2012, pp. 1-7. (2012).
Keizer, et al., "New Method and Arrangement for Feeding Chemicals Into a Hydrofracturing Process and Oil and Gas Applications," U.S. Appl. No. 13/645,671, filed Oct. 5, 2012.
George E. King et al., Hydraulic Fracturing 101: What Every Representative, Environmentalist, Regulator, Reporter, Investor, University Researcher, Neighbor, and Engineer Should Know About Estimating Frac Risk and Improving Frac Performance in Unconventional Gas and Oil Wells, SPE 152596, Society of Petroleum Engineers, as submitted to the SPE Conference The Woodlands Texas, pp. 1-80, (Feb. 2012).
Warner, et al., "Impacts of Shale Gas Wastewater Disposal on Water Quality in Western Pennsylvania", Environ. Sci. Technol., 47 (20), pp. 11849-11857 (2013).

* cited by examiner

FREEZE CONDITIONING AGENTS UTILIZING CRUDE GLYCERIN AND FLOWBACK AND PRODUCED WATER

CROSS-REFERENCE TO RELATED APPLICATIONS

Not Applicable. STATEMENT REGARDING FEDERALLY SPONSORED RESEARCH OR DEVELOPMENT Not Applicable.

BACKGROUND OF THE INVENTION

The invention relates to compositions, methods, and apparatuses for improving dust control and freeze conditioning. In particulate and/or aggregate handling operations, freezing weather can halt operations. For example, ores such as coal can carry a significant amount of moisture. The moisture on the surface of the ore, when frozen, causes the chunks of ore to agglomerate into large, unwieldy lumps, creating a handling problem. The ore can also freeze to the walls of hopper cars and railroad cars that are used to transport the coal, which further causes a material handling problem. It would be desirable to identify an economical and highly-effective freeze conditioning agent that also is green and derived from renewable sources.

Deicing and anti-icing compositions comprising glycerol-containing by-products of triglyceride processing processes are disclosed in U.S. Pat. No. 6,890,451. Deicing and anti-icing compositions comprising short-chain polyols including glycerol and various wetting agents, antioxidants/preservatives, buffers, and/or freeze point depressants are disclosed in US Published Patent Application 2005/0087720 A1.

U.S. Pat. Nos. 6,878,308 and 6,416,684 disclose using molasses solids or sugar/de-sugared solutions to prevent freeze clumping of aggregate solids, and in anti-icing and de-icing applications. U.S. Pat. Nos. 7,108,800 and 7,398,935 disclose glycerin-containing by-product derived from transesterification processes. The glycerin-containing by-product contains about 45 to about 90 weight percent glycerin. U.S. Pat. No. 6,589,442, discloses that a partially saponified mixture of crude tall oil and vegetable oil, emulsified in water, can be used as a dust control agent. U.S. Pat. No. 5,079,036 discloses a method if inhibiting freezing and improving flow and handleability characteristics of solid, particular materials, utilizing foam comprised of a brine solution.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

To satisfy the long-felt but unsolved needs identified above, at least one embodiment of the invention is directed towards a method of inhibiting the agglomeration of a particulate material exposed to below freezing temperature. The method comprises the step of applying to the particulate material PTFP and crude glycerin. The crude glycerin may comprise bottom stream. The PTFP may essentially be flowback water and/or produced water. The PTFP and crude glycerin may be pre-mixed before contacting the particulate material and/or may not contact each other until after they are applied to the particulate material. The dosage of crude glycerin in the presence of the below freezing temperature may be insufficient to prevent the agglomeration of the particulate material but for the presence of the PTFP. The agglomeration may be at least 10% more effective than would occur if particulate material were instead treated with an identical amount of crude glycerin and an identical amount of water which was non-PTFP water.

The PTFP may comprise at least one item selected from the group consisting of: hydrochloric acid, acetic acid, formic acid, 2,2-Dibromo-3-nitrilopropionamide, polycyclic organic matter, polynuclear aromatic hydrocarbons, gluteraldehyde, diammonium peroxidisulphate, ammonium persulfate, ammonium sulphate, ethylene glycol, glycol ethers, salts, tetramethyl ammonium chloride, potassium chloride, methanol, propargyl alcohol, boric acid, monoethanolamine, polyacylamide sodium acrylate-acylamide copolymer, guar gum, citric acid, thioglycolic acid, diesel, benzene, toluene, ethylbenzene, xylene, naphthalene, sand, ceramic beads, ammonium chloride, polyacrylate, methanol, isopropanol, peracid, biocide, breaker, clay stabilizer, corrosion inhibitor, crosslinker, friction reducer, gelling agent, iron control agent, linear gel carrier fluid, proppant, scale inhibitor, surfactant, and any combination thereof. The PTFP may comprise at least one item selected from the group consisting of: chloride, strontium, barium, boron, chromium, selenium, lead, arsenic, radium-226, heavy metals, methane, alkali metals, alkaline earth metals, anionic ions, cationic ions, dispersed rock, and any combination thereof. The PTFP and crude glycerin may be distributed throughout a pile of particulate material, at the surface of a particulate material, and/or as a side release agent on the surface of a container the particulate material is or will be placed within.

The ratio of PTFP relative to crude glycerin may be within range of from 1:99 to 99:1. Either or both of the PTFP and the crude glycerin may comprise at least one salt in an amount sufficient to induce corrosion on an iron comprising object in contact with the particulate material but the salt will not induce such corrosion or displays a reduction in corrosion relative to the corrosion expected upon the addition of the salt or at leats is no worse than the corrosion observed in the absence of the salt.

At least one embodiment of the invention is directed towards a composition comprising PTFP and crude glycerin. The ratio of PTFP relative to crude glycerin may be within range of from 1:99 to 99:1. The PTFP and/or the crude glycerin may be is essentially untreated.

At least one embodiment of the invention is directed towards a composition comprising PTFP and glycerin.

At least one embodiment of the invention is directed towards a method of inhibiting the agglomeration of a particulate material exposed to below freezing temperature, the method comprising the step of applying to the particulate material PTFP and glycerin.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"PTFP" means a fluid comprising flow back water and/or produced water it includes fluids that are untreated or at least partially treated.

"Freeze Conditioning Agent" is a process or composition of matter, which inhibits the agglomeration of materials when exposed to freezing temperatures, they can be mixed with other freeze conditioning agents, de-icing agents, and/or anti-icing agents.

"Bottom Stream" is the residue of a distillation, refinement, separation, or filtration process of a biodiesel manufacturing process, or of a transesterification reaction involving triglycerides, or of a glycerin refining process.

"Crude glycerin" means a by-product derivative from a transesterification reaction involving triglycerides including transesterification reactions involving biodiesel manufacturing processes, in which the by-product comprises glycerin and at least one component selected from the list consisting of: fatty acids, esters, salt, methanol, tocopherol, sterol, mono-glycerides, di-glycerides, and tri-glycerides, Bottom Stream is a form of Crude Glycerin.

"Transesterification reactions involving triglycerides" is the splitting of triglyceride esters derived from vegetable oils, plant oils, and/or animal fats in the presence of base and a monohydroxy alcohol such as methanol or ethanol to produce monoesters of the fatty acids comprising the original triglycerides.

"Particulating Material" means a material that has a tendency to form dust particles when handled, processed, or contacted, which includes but is not limited to coal, dirt, wood chips, agricultural products, fruits, fertilizers, ores, mineral ores, fine materials, sand, gravel, soil, fertilizers, or other dust generating material, and any combination thereof, particulating material may form agglomerated masses when exposed to cold, freezing, or lower temperatures.

"Agglomerated Particulating Material" means a mass comprising one or more particulating materials that has become agglomerated into a unitary solid through a freezing or other agglomeration process.

"Unagglomerated Particulating Material" is a mass comprising one or more particulating materials that has not become agglomerated into a unitary solid through a freezing or other agglomeration process. "Breaker composition" means a composition of matter capable of inhibiting or deactivating at least one of the characteristics of a chemical additive for which the chemical additive is typically injected into a hydrocarbon process line.

"Chemical Additive" means a composition of matter injected into at least one location of a hydrocarbon process line which has a particular chemical or physical characteristic that enhances the extraction of hydrocarbons.

"Consisting Essentially of" means that the methods and compositions may include additional steps, components, ingredients or the like, but only if the additional steps, components and/or ingredients do not materially alter the basic and novel characteristics of the claimed methods and compositions.

"Disinfectant" means an agent that kills all vegetative cells including most recognized pathogenic microorganisms, using the procedure described in A.O.A.C. Use Dilution Methods, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

"Dispersion" means a liquid mixture in which a dispersed phase liquid is effectively distributed throughout a continuous phase liquid.

"Distal" is the opposite of "Proximal" and means subsequent to a particular step in a sequential process.

"Emulsion" means a liquid dispersion in which a dispersed phase liquid, which is otherwise immiscible within a continuous phase liquid, is effectively distributed throughout the continuous phase liquid by means of some chemical and/or process.

"Fracking Fluid" means a composition of matter injected into a hydrocarbon process line to facilitate a hydrofracturing process, fracking fluids commonly comprise one or more of: acid, biocide, breaker, clay stabilizer, corrosion inhibitor, crosslinker, friction reducer, gelling agent, iron control agent, linear gel carrier fluid, proppant, scale inhibitor, surfactant, and water.

"Free," "No," "Substantially no" or "Substantially free" means a composition, mixture, or ingredient that does not contain a particular compound or to which a particular compound or a particular compound-containing compound has not been added. According to the invention, the reduction and/or elimination of hydrogen peroxide according to embodiments provide hydrogen peroxide-free or substantially-free compositions. Should the particular compound be present through contamination and/or use in a minimal amount of a composition, mixture, or ingredients, the amount of the compound shall be less than about 3 wt-%. More preferably, the amount of the compound is less than 2 wt-%, less than 1 wt-%, and most preferably the amount of the compound is less than 0.5 wt-%.

"Hydrocarbon Process Line" means any portion of the process of removing hydrocarbon fluids from an subterranean formation which involves the flow of a fluid, this includes but is not limited to the flow of one or more fluids down a well bore into the subterranean formation as well as the flow of hydrocarbons or other fluids back up the well bore, it also includes the flow of fluids used in a hydrofracturing process, and includes the treatment of waste fluids produced by the hydrocarbon extraction process.

"Proppant" means a particulate material, often solid, including but not limited to sand which is suspended in water or other fluid and used in hydraulic fracturing to keep fissures open.

"Microorganism" means any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

"Peroxygen producing chemical" means a composition of matter that contains two or more oxygen atoms in the form of an oxygen-oxygen bond and that induce a higher oxidation state in another composition of matter, peroxygen producing chemical includes but is not limited to: hydrogen peroxide, percarbonate salts, persulfate salts, perborate salts, permanganate salts, carbamide peroxide, and alkyl peroxides such as tert-butyl hydroperoxide and potassium monopersulfate, and any compound of the formula R—$(COOOH)_n$ in which R can be hydrogen, alkyl, alkenyl, alkyne, acylic, alicyclic group, aryl, heteroaryl, or heterocyclic group, and n is 1, 2, or 3, and named by prefixing the parent acid with peroxy, as well as those sulfonated carboxylic acid compositions described in as disclosed in US Published Patent Applications 2010/0021557, 2010/0048730 and 2012/0052134.

"Proximal" is the opposite of "Distal" and means prior to a particular step in a sequential process.

"Coagulant" means a water treatment chemical often used in solid-liquid separation stage to neutralize charges of suspended solids/particles so that they can agglomerate, coagulants are often categorized as inorganic coagulants, organic coagulants, and blends of inorganic and organic coagulants, inorganic coagulants often include or comprise aluminum or iron salts, such as aluminum sulfate/choride, ferric chloride/sulfate, polyaluminum chloride, and/or aluminum chloride hydrate, organic coagulants are often positively charged polymeric compounds with low molecular weight, including but not limited to polyamines, polyquaternaries, polyDADMAC, Epi-DMA, coagulants often have a higher charge density and lower molecular weight than a flocculant, often when coagulants are added to a liquid containing finely divided suspended particles, it destabilizes and aggregates the solids through the mechanism of ionic charge neutralization, additional properties and examples of coagulants are recited in *Kirk-Othmer Encyclopedia of Chemical Technology*, 5th Edition, (2005), (Published by Wiley, John & Sons, Inc.).

"Filter" means a structure constructed and arranged to remove suspended materials from within a liquid that is passed through it, more detailed descriptions of filters and filtration are described in *The Nalco Water Handbook* (3rd Edition), by Daniel Flynn, McGraw Hill (2009) in general and in particular pp. 6.1-8.30.

"Filter Cake" means the accumulation of solid matter that is retained on a filter, it increases in the course of filtration and becomes thicker as more particulate matter is retained, with increasing layer thickness the flow resistance of the filter cake increases, and if not removed soon enough, eventually thick filter cake can disrupt filtration because the flow resistance of the filter cake gets so high that too little of the mixture to be filtered can pass through the filter cake and filter plugs.

"Flocculant" means a composition of matter which when added to a liquid carrier phase within which certain particles are thermodynamically inclined to disperse, induces agglomerations of those particles to form as a result of weak physical forces such as surface tension and adsorption, flocculation often involves the formation of discrete globules of particles aggregated together with films of liquid carrier interposed between the aggregated globules, as used herein flocculation includes those descriptions recited in ASTME 20-85 as well as those recited in *Kirk-Othmer Encyclopedia of Chemical Technology*, 5th Edition, (2005), (Published by Wiley, John & Sons, Inc.), flocculants often have a low charge density and a high molecular weight (in excess of 1,000,000) which when added to a liquid containing finely divided suspended particles, destabilizes and aggregates the solids through the mechanism of interparticle bridging.

"Flocculating Agent" means a composition of matter which when added to a liquid destabilizes, and aggregates colloidal and finely divided suspended particles in the liquid, flocculants and coagulants can be flocculating agents.

"Membrane" means a structure having lateral dimensions much greater than its thickness though which a mass transfer may occur, membranes may be used to filter liquids.

"MF" means microfiltration, a membrane based separation process in which particles and dissolved macromolecules larger than 0.1 μm do not pass through the membrane, MF may be pressure driven.

"NF" means nanofiltration, a membrane based separation process in which particles and dissolved macromolecules larger than 1 nm do not pass through the membrane, NF may be pressure driven.

"RO" means reverse osmosis a water purification technology that uses a hydrostatic force (a thermodynamic parameter) to overcome osmotic pressure (a colligative property) in the water to remove one or more unwanted items from the water, RO may be a membrane based separation process, wherein the osmotic pressure is overcome by the hydrostatic force, it may be driven by chemical potential, RO may be pressure driven, RO can remove many types of molecules and ions from solutions and is used in both industrial processes and in producing potable water, in a pressurized RO process the solute is retained on the pressurized side of the membrane and the pure solvent is allowed to pass to the other side, to be "selective," an RO membrane may be sized to not allow large molecules or ions through the pores (holes), and often only allows smaller components of the solution (such as the solvent) to pass freely, in some cases dissolved molecules larger than 0.5 nm do not pass through membrane.

"Separation" means a mass transfer process that converts a mixture of substances into two or more distinct product mixtures, at least one of which is enriched in one or more of the mixture's constituents, it includes but is not limited to such processes as: Adsorption, Centrifugation, cyclonic separation, density based separation, Chromatography, Crystallization, Decantation, Distillation, Drying, Electrophoresis, Elutriation, Evaporation, Extraction, Leaching extraction, Liquid-liquid extraction, Solid phase extraction, Flotation, Dissolved air flotation, Froth flotation, Flocculation, Filtration, Mesh filtration, membrane filtration, microfiltration, ultrafiltration, nanofiltration, reverse osmosis, Fractional distillation, Fractional freezing, Magnetic separation, Precipitation, Recrystallization, Sedimentation, Gravity separation, Sieving, Stripping, Sublimation, Vapor-liquid separation, Winnowing, Zone refining, and any combination thereof.

"Stable Emulsion" means an emulsion in which droplets of a material dispersed in a carrier fluid that would otherwise merge to form two or more phase layers are repelled from each other by an energy barrier, the energy barrier may be at least 20 kT, more, or less, the repulsion may have a half-life of at least a few years. Enabling descriptions of emulsions and stable emulsions are stated in general in *Kirk-Othmer, Encyclopedia of Chemical Technology*, Fourth Edition, volume 9, and in particular on pages 397-403.

"Submerged Membrane" means a membrane positioned entirely beneath the surface layer of a liquid and which effects mass transfer of materials suspended within the liquid it is submerged within.

"Surfactant" is a broad term which includes anionic, nonionic, cationic, and zwitterionic surfactants. Enabling descriptions of surfactants are stated in *Kirk-Othmer, Encyclopedia of Chemical Technology*, Third Edition, volume 8, pages 900-912, and in *McCutcheon's Emulsifiers and Detergents*, both of which are incorporated herein by reference.

"Ultrafiltration" means a process of filtration in which hydrostatic pressure forces a filtrate liquid against a semipermeable membrane, suspended solids and solutes of high molecular weight are retained, while water and low molecular weight solutes pass through the membrane, it is used in industry and research for purifying and concentrating macromolecular ($10^3$-$10^6$ Da) solutions, it includes but is not limited to microfiltration, nanofiltration or gas separation, it may be applied in cross-flow or dead-end mode and separation in ultrafiltration may undergo concentration polarization the exact metes and bounds and protocols for applying and categorizing ultrafiltration are elucidated in the scientific reference: *Ultrafiltration and Microfiltration Handbook, Second Edition*, by Munir Cheryan, Published by CRC Press LLC, (1998).

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims. All illustrated chemical structures also include all possible stereoisomer alternatives.

At least one embodiment of the invention is a composition of matter comprising PTFP such as flowback water and crude glycerin. At least one embodiment is a composition of matter comprising PTFP such as produced water and crude glycerin. At least one embodiment is a method of freeze conditioning an agglomerated particulating material by applying to this material a composition comprising crude glycerin, flowback water, and or produced water.

Flowback water and produced water are byproducts of the hydrofracturing process. As described for example in U.S. patent application Ser. No. 13/645,671 and in US Published Patent Applications 2011/0180263, 2011/0180422, 2012/0118579, 2012/0152816, 2010/00163230, 2008/0128125, 2008/0176770, hydraulic fracturing or "hydrofracturing" is a procedure used to stimulate the extraction of hydrocarbons from a subterranean formation having a hydrocarbon-bearing zone using hydraulic pressure to fracture the formation. Hydrofracturing involves injecting a fracturing fluid down a well bore at high pressure. The fracturing fluid is often a mixture of fluid such as water and proppant. Other chemicals may be added to the proppant to aid in proppant transport, friction reduction, wettability, pH control and bacterial control.

During the fracturing process, the fracturing fluid penetrates hydrocarbon bearing subterranean formations at sufficient hydraulic pressure to create (or enhance) underground cracks or fractures-with the proppant particulates supporting the fracture for "flow back." Sometimes the process is repeated a multiple number of times at the well site. When this is done, the well head is closed between stages to maintain water pressure of the fracturing fluid for a period of time.

Fracturing treatments stimulate hydrocarbons extraction by creating more flow paths or pathways for the hydrocarbons to travel up the well bore for retrieval. Matrix treatments are different in that they are intended to restore natural permeability of the underground formation following damage. The make-up of the fracturing fluid is often designed to address different situations of this kind by making adjustments in the material and chemical content of the fluid and proppant particulates.

All of these procedures, from drilling the wellbore, to completion, to workover, employ appropriate fluids. During the initial drilling and construction of the wellbore, the fluids are often referred to as drilling fluids. In other stages, such as well completion, servicing, or workover, the fluids introduced into the wellbore are often referred to as treatment fluids, completion fluids, or workover fluids. A well treatment fluid is used for a wide range of purposes, such as stimulation, isolation, or control of reservoir gas or water or formation particles. As used herein, however, a "treatment fluid" includes any appropriate fluid to be introduced into a wellbore, whether during drilling, completion, servicing, workover, or any other such stage.

More particularly, for example, a treatment performed to enhance or restore the productivity of a well is called a stimulation treatment. Stimulation treatments fall into two main groups, matrix treatments and hydraulic fracturing treatments. Matrix treatments are performed below the reservoir fracture pressure and generally are designed to restore or enhance the natural permeability of the reservoir in the near-wellbore area. Matrix operations can include treating the formation with an acid to dissolve some of the acid soluble rock material. For various reasons known in the art, is sometimes desirable to perform a matrix treatment with a viscosified or gelled fluid.

Fracturing treatments are performed above the fracture pressure of the reservoir formation and create a highly conductive flow path between the reservoir and the wellbore. In general, hydraulic fracturing involves injecting a fracturing fluid through the wellbore and into an oil and gas bearing subterranean formation at a sufficiently high rate of fluid flow and at a sufficiently high pressure to initiate and extend one or more fractures in the formation. To conduct hydraulic pressure through the wellbore, the fracturing fluid must be relatively incompressible under the treating conditions. In addition, because of the large quantities of fracturing fluid required, the fracturing fluid is preferably based on readily-available and plentiful fluid. Thus, the typical fracturing fluid is based on water.

Flowback water (aka backflow water) is a murky, salty water which flows to the surface during hydrofracturing operations. Flowback water comprises fracking fluid which returns to the surface. This water contains clay, dirt, metals, chemicals and even diesel that may have been added. Flowback water also contains formation water (aka produced water) which is brine rich water that was present in the subterranean formation prior to the beginning of the hydrofracturing operation.

When categorizing flowback water it is useful to refer to the frac load recovery, which is a measure of how much of the injected fracking fluids return within the flowback water. Typically the frac load recovery can be anywhere from 15-40% percent of the volume of fracking fluid that was injected down into the well. It may flow back over a period of 3-4 weeks after its injection, most of it within 7 to 10 days. Often more than half of the fracking fluid remains in the formation. At a certain point there is a transition between primarily recovering frac fluid to that of produced water. Usually this point is difficult to distinguish, yet may be discerned from the different chemical signatures of the frac water versus the naturally occurring water produced by the formation. A typical flowback of frac fluids might run 40,000 bbl. After the initial 3-4 week post-fracing recovery of fluids, an additional 10,000 to 30,000 bbl of produced water may flow for up to two years.

Flowback water may be characterized as having high salinity and total dissolved solids (TDS) (up to and including >20% TDS). It is laden with the same fracing chemicals that were pumped into the well, in addition to any unique contaminants that are present in the rock formation water deep below. In addition to natural salinity of water in the formation, any fresh water that is forced down a well, when it is fraced, will tend to dissolve salts in the formation thus giving the recovered water very high salinity.

As described in the article: *Impacts of Shale Gas Wastewater Disposal on Water Quality in Western Pennsylvania*, by Nathanial Warner et al., Environ. Sci. Technol., 47 (20), pp. 11849-11857 (2013), due to its chemical nature (which may be toxic and/or radioactive) flowback water is considered to be a waste material which requires significant efforts to dispose of. Flowback water often cannot be disposed of as sewage because municipal treatment plants are not designed to handle the chemical composition of flowback water. To accommodate the vast volumes of flowback water being produced would require large scale retooling of existing municipal sewage treatment plants which is not feasible.

Often flowback water is collected in metal tanks or else open pools, lagoons or pits lined with one or more layers of plastic. These are then pumped dry, and water is usually either recycled for fracing additional wells or else trucked off site to a waste water disposal facility. Containment pits, or open-air ponds that are lined with plastic, can become points of failure. Occasionally, liners get cracked or damaged. Contaminated fluids can then leach into ground water.

Because of the large volumes of fluids recovered as flowback water disposing of flowback water is evolving into a significant commercial burden. This has even led to drillers to attempt to shift to closed loop systems as a method of handling flowback water. This however is a mere stopgap because each hydrofracturing operation increases the net volume of flowback water in circulation and this means the amount of fluid produced exceeds the capacity to reuse fluid. Thus at least one embodiment of the invention improves the environment by reducing the disposal of flowback water into sewage treatment plants. In at least one embodiment flowback water is combined with crude glycerin. This results in a composition of matter useful for freeze conditioning an agglomerated particulating material. In at least one embodiment the flowback water comprises 1-999,999 ppm of one or more of chloride, strontium, barium, boron, chromium, selenium, lead, arsenic, radium-226, heavy metals, methane, alkali metals, alkaline earth metals, anionic ions, cationic ions, and any combination thereof.

As described in U.S. Pat. Nos. 5,891,225, 4,426,409 and 4,778,615, and published US Patent Application 2009/0127499, without being limited by theory, it is believed that freeze conditioning results from a weakening of the bonds between forming ice crystals which prevents agglomeration of the particulate material into a solid mass. Thus, although water contained in the particulate material is frozen in a typical application, the particulate material does not freeze into a unified solid mass.

Freeze conditioning is therefore distinct from de-icing or anti-icing. For purposes of this application, the definition of "de-icing" is a process in which formed ice is converted to water by depressing the freezing point depression of the ice. For purposes of this application, the definition of "anti-icing" is a process in which an agent is applied to a surface or material to prevent formation of ice when the surface or material is contacted by precipitation. Most importantly, the dosage required for freeze conditioning is substantially lower than the dosage required for de-icing or anti-icing. In at least one embodiment the composition is applied to particulating materials under conditions such that (so cold that) and in a dosage such that the composition is ineffective as a de-icing agent but is effective as a freeze conditioning agent.

As described in US Published Patent Application 2008/0085846 crude glycerin is a byproduct of a biodiesel manufacturing process. Biodiesel is typically made through a chemical process called transesterification in which vegetable oil or animal fats are converted to fatty acid alkyl esters and glycerin by-products. Such oils and fats include, for example, tallow, crude tall oil, coconut oil, rapeseed oil, canola oil, palm kernel oil and soybean oil. Triglycerides, the principal components of animal fats and of vegetable oils, are esters of glycerol, a trihydric alcohol, with fatty acids of varying molecular weight. Fatty acids and fatty acid alkyl esters can be produced from oils and fats by base-catalyzed transesterification of the oil, direct acid-catalyzed esterification of the oil and conversion of the oil to fatty acids and subsequent esterification to biodiesel.

The majority of fatty acid alkyl esters are produced by the base-catalyzed method. In general, any base may be used as the catalyst used for transesterification of the oil to produce biodiesel, however sodium hydroxide or potassium hydroxide are used in most commercial processes.

In the biodiesel manufacturing process, the oils and fats can be filtered and preprocessed to remove water and contaminants. If free fatty acids are present, they can be removed or transformed into biodiesel using special pretreatment technologies, such as acid catalyzed esterification. The pretreated oils and fats can then be mixed with an alcohol and a catalyst (e.g. base). The base used for the reaction is typically sodium hydroxide or potassium hydroxide, being dissolved in the alcohol used (typically ethanol or methanol) to form the corresponding alkoxide, with standard agitation or mixing. It should be appreciated that any suitable base can be used. The alkoxide may then be charged into a closed reaction vessel and the oils and fats are added. The system can then be closed, and held at about 71° C. (160° F.) for a period of about 1 to 8 hours, although some systems recommend that the reactions take place at lower or higher temperatures or even at room temperature, and for longer or shorter periods of time.

Once the reactions are complete the oil molecules (e.g. triglycerides) are hydrolyzed and two major products are produced: 1) a crude fatty acid alkyl esters phase (i.e.

biodiesel phase) and 2) a glycerin by-product phase (i.e. crude glycerin). Typically, the crude fatty acid alkyl esters phase forms a layer on top of the denser crude glycerin phase. Because the crude glycerin phase is denser than the biodiesel phase, the two can be gravity separated. For example, the crude glycerin phase can be simply drawn off the bottom of a settling vessel. In some cases, a centrifuge may be employed to speed the separation of the two phases.

The crude glycerin typically comprises a mixture of glycerin, methyl esters, methanol, mong and inorganic salts and water. Mong is "material organic non glycerol". Mong normally comprises soaps, free fatty acids, and other impurities. Crude glycerin may comprise one or more of methyl esters and/or methanol in an amount of about 0.01 to about 5 percent.

Representative inorganic salts that may be present in crude glycerin include, for example, salts (e.g. chlorides and sulfates) of sodium, potassium and/or calcium. In an embodiment, the by-products can contain about 0.01 to about 15 weight percent of the inorganic salts. In at least one embodiment, the inorganic salts are selected from sodium and potassium chloride.

In at least one embodiment the crude glycerin has added to it one or more functional additives and/or is optionally diluting to the desired glycerin concentration with any suitable diluent, preferably water. Water can be de-ionized or distilled.

In at least one embodiment the crude glycerin is further refined prior to use, for example by washing, acidulation or distillation to adjust the glycerin concentration and/or remove impurities.

It has been discovered that application of compositions comprising crude glycerin and flowback water effectively prevent the agglomeration of particulate materials and adhesion of the particulate materials to surfaces upon exposure to subfreezing temperatures. This phenomena, is referred to as "freeze conditioning".

In at least one embodiment the composition is applied to a particulating material which is one or more of: coal, wood chips, agricultural products, fruits, fertilizers, mineral ores, fine materials, or other aggregates. In at least one embodiment the composition is applied to the particulate material while the particulate material is in an unagglomerated state in an amount effective to prevent agglomeration of the material upon exposure to subfreezing temperatures.

In at least one embodiment the composition is applied to the particulate material while it is in an unagglomerated, free-flowing state, for example by spraying onto the material as it is falling from a chute or being transported on a conveyor.

In at least one embodiment the composition is applied to the particulate material at a dosage of about 1 pint to about 8 pints of crude glycerin per ton of particulate material, depending on whether the application is freeze-conditioning.

In at least one embodiment the composition provides superior freeze conditioning effects than a similar composition comprising a similar or greater amount of crude glycerin but in which a fluid other than flowback water and/or produced water (collectively "PTFP") is used (such as potable water, fresh water, lake water, river water, and sea water). As further explained in the example section, a synergistic effect occurs between the crude glycerin which manifests in the composition being up to, equal to, or more than at least 14% more effective a freeze conditioning agent than crude glycerin in the absence of PTFP.

The effectiveness of the PTFP-crude glycerin composition is quite unexpected and in fact is opposite what is expected based on the prior art. U.S. Pat. No. 5,891,225 describes the use of brine bearing compositions for use as freeze conditioning. It implies that there is a link between melting power and moisture retention and also teaches that there is an unfortunate tradeoff between melting power and tendency for corrosion. (U.S. Pat. No. 5,891,225, Col. 5 lines 32-49). In contrast the invention relies on chemistry utterly unrelated to those references to enhance the freeze conditioning capacity of crude glycerin. In addition due to the high amount of ionic dissolved or dispersed solids in the PTFP (and often in crude glycerin as well) it would be expected that such a composition would be highly corrosive, yet as the data in the examples section shows, often the composition is not corrosive and even when corrosion occurs the corrosion is less than or about equal to corrosion in the absence of the salt and is less than expected for the salt solution.

Without being limited by a particular theory or design of the invention or of the scope afforded in construing the claims, it is believed that the complex cocktail of fracking fluid constituents and in particular high molecular weight polymer friction reducers affect the geometry of ice crystals that form during the freezing process to have significantly less granularity and therefore agglomerate much less. As a result the presence of frozen water does not prevent the pouring, rolling, and otherwise free flowing of the particulate material even after prolonged exposure to sub-freezing temperatures.

In addition, the PTFP-crude glycerin composition comprises a number of materials from the fracking fluid and from the subterranean formation which may have superior synergistic interactions. Fracking fluids often comprise organophosphonates and produced water often contains humic acids. These two have corrosion resisting properties and their combination in the presence of the other rheology affecting chemicals may cause an enhanced corrosion resisting effect. As a result superior freeze conditioning can be achieved without any undo corrosive tradeoff. In at least one embodiment the composition comprises <1->99% crude glycerin.

In at least one embodiment the PTFP is at least in part one of those described in, or is one treated with or according to one of the respective compositions or methods described in one or more of the articles:

Produced and Flowback Water Recycling and Reuse Economics, Limitations, and Technology, by_Pam Boschee, Oil and Gas Facilities, pp. 16-22 (February 2014);

Geochemical evaluation of flowback brine from Marcellus gas wells in Pennsylvania, USA, by Lara O. Haluszczak et al., pp. 1-7, Appl. Geochem. (2012); and Hydraulic Fracturing 101: What Every Representative, Environmentalist, Regulator, Reporter, Investor, University Researcher, Neighbor, and Engineer Should Know About Estimating Frac Risk and Improving Frac Performance in Unconventional Gas and Oil Wells, by George E. King et al., SPE 152596, Society of Petroleum Engineers, as submitted to the SPE Conference The Woodlands Texas, pp. 1-80, (February 2012).

In at least one embodiment the composition comprises <1->99% suspended solids from the subterranean formation.

In at least one embodiment the composition comprises <1->99% fracking fluid.

In at least one embodiment the composition comprises <1->99% suspended and/or dissolved solids.

In at least one embodiment the suspended and/or dissolved solids comprises <1->99% of calcium chloride, sodium chloride, and any combination thereof.

In at least one embodiment at least some of the PTFP and/or the crude glycerin is diluted with one or more other kinds of water.

In at least one embodiment the crude glycerin comprises 40-99.9% glycerin.

In at least one embodiment the composition comprises untreated PTFP and/or untreated crude glycerin. The untreated PTFP may comprise <1->99% of the composition. The untreated crude glycerin may comprise <1->99% of the composition.

In at least one embodiment at least some of the PTFP is at least partially treated. As previously mentioned produced water and flowback water contain a number of constituents including some which are toxic, harmful, and/or are otherwise unwanted. In a partial treatment, at least some of the constituents of the produced water or flowback water are removed but others may remain. Some examples of partial treatments include but are not limited to: application of sulfates (including but not limited to sodium sulfate) to produced water or flowback water which removes barium, adding lime (including but not limited to calcium hydroxide or calcium oxide) to remove metals such as iron or copper, and/or use of a Separation process to remove one or more constituents of a fracking fluid (including but not limited to proppant), and any combination thereof.

In at least one embodiment the composition is applied as a side release agent. Side release agents are compositions tailored to adhere to the sides of a container susceptible to freezing conditions such as railroad cars, trucks and beds, and the like. As a result they further prevent agglomerating materials from becoming stuck to these cold exposed surfaces. In at least one embodiment the composition is applied as both a side release agent and to the agglomerating material as well. In at least one embodiment the composition is the side release agent and a different composition is applied as a freeze conditioning agent. In at least one embodiment the composition is used along with one or more other side release agents. In at least one embodiment the side release agent has a greater viscosity than the freeze conditioning agent applied to the mass.

In at least one embodiment the crude glycerin and the PTFP are combined more than 1 hour prior to their application to the mass. In at least one embodiment the crude glycerin and the PTFP are combined less than 1 hour prior to their application to the mass. In at least one embodiment the crude glycerin and the PTFP are combined simultaneous to their application to the mass.

In at least one embodiment the crude glycerin is raw crude glycerin unchanged from the form in which it was produced. In at least one embodiment the crude glycerin is modified to have some or substantially all of one or more of its constituents relative amounts increased or decreased. In at least one embodiment the PTFP is raw PTFP unchanged from the form in which it was collected from a well. In at least one embodiment the PTFP is modified to have some or substantially all of one or more of its constituents relative amounts increased or decreased.

EXAMPLES

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

Example 1

Ice Crush Test

Figure 1:
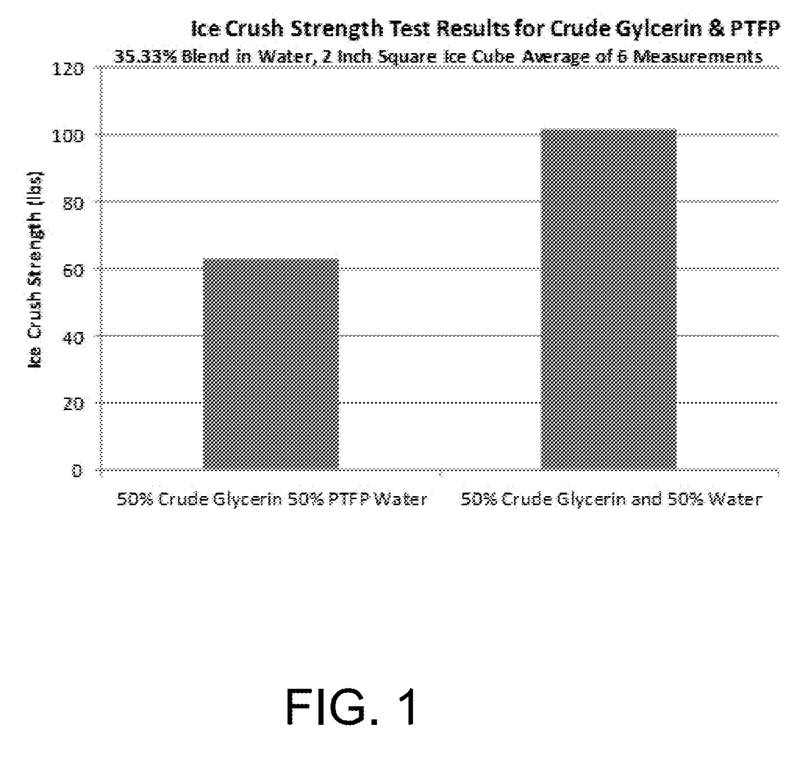
FIG. 1 is a graph illustrating how the invention has superior freeze conditioning properties when compared to the prior art.

A number of 2 inch×2 inch×2 ice cubes were prepared with various amounts of either crude-glycerin-flowback water mixture or crude-glycerin-tap water mixture in a silicone mold left at −12° F. for at least 16 hours. The compressive strength of the ice cubes was measured using an Applied Testing Systems model 1101 Universal Testing Machine. The machine's jaws were placed in a similarly chilled freezer for an hour as well. When used for the test the jaws were adjusted so that it moved against the cubes at rate of 0.5 inches/minute. The applied force was measured with a gauge and was noted when it caused the cubes to fracture. The results are shown in FIG. 1 which illustrates that crude-glycerin—flowback water mixture results in ice cubes that are frozen but which due to freeze conditioning fracture with much less energy. In this example the flowback water caused a sample of crude glycerin to be as effective as a sample containing a 14% higher glycerin content in the absence of flowback water would be.

Example 2

Corrosion Test

Background

Three samples of product were submitted for compatibility testing to determine if the samples had the same compatibilities with mild steel. The samples were a mixture of crude glycerin from a biodiesel plant mixed with various kinds of water. One sample was crude glycerin in tap water and the other two samples were crude glycerin in different concentrations of flowback water recovered from a hydrofracturing operation.

Figure 2:
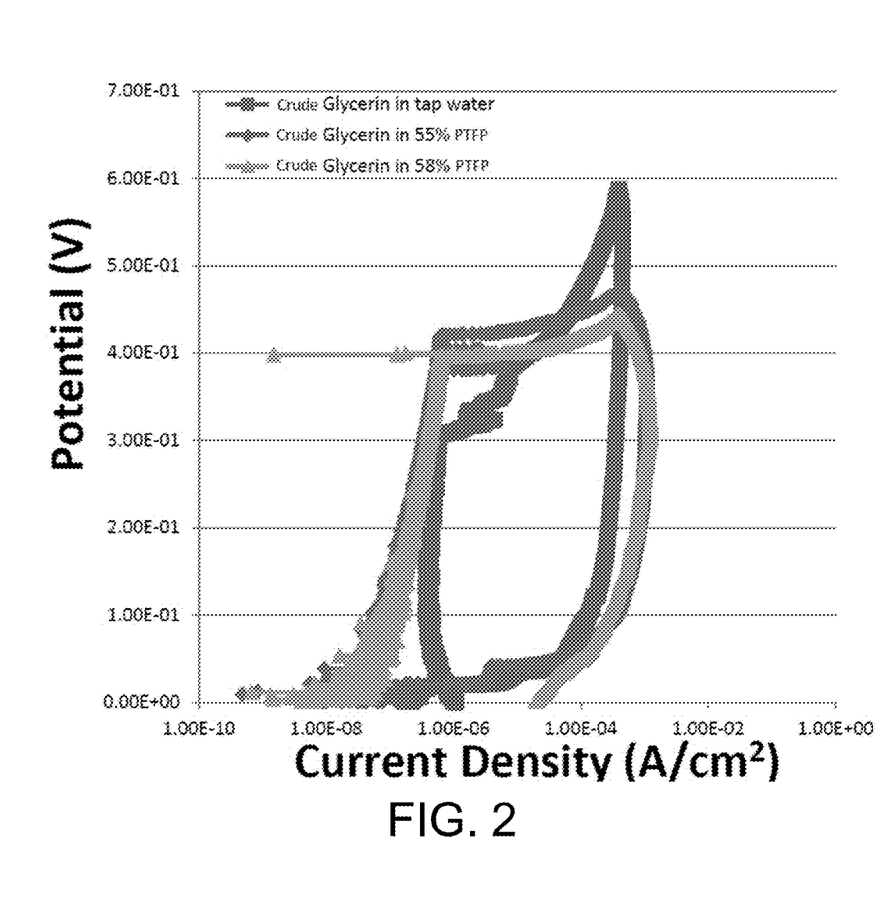
FIG. 2 is a graph illustrating how the invention has superior corrosion resistance properties when compared to the prior art as measured with cyclic polarization scans of crude glycerine in tap water, 55% PTFP, and 58% PTFP at 75° F.

FIG. 2 shows the results of cyclic polarization scans performed on 316L SS coupons treated with each sample to measure pitting or corrosion. The coupons were polished to a 1200 grit finish and were rinsed and cleaned with distilled water and acetone. They were then attached to the bottom of the specimen holder and exposed a 4.9 cm2 surface area to the product. The scans were performed at 75° F. The polarization continued forward until the current exceeded 0.001 A/cm2.

A reference 600 TM Potentiostat/Galvanostat/ZRA was used to perform anodic cyclic polarization tests. The potentiostat is connected to the computer by a USB interface. DC105-DC Corrosion Techniques Software was installed in the computer to perform the tests. A flushed-port cell wass used for performing the anodic cyclic polarization. 600 mL of each solution was used in the cell. The top part of the glass cell is sealed with the non-metallic bottom part (specimen holder made from PTFE) which has a suitable neck. The holes in the top part of the cell hold the electrodes. In order to avoid the temperature lag between solution and specimen, the solution is stirred with a shaft rotating at 500 rpm.

A Ag/AgCl reference electrode was used and was placed in electrical contact with the test solution by the use of a lugging capillary placed in the solution. A counter electrode of graphite was used in the primary solution.

The various samples used for the following corrosion tests were as follows:

TABLE 1

Samples Used

| Sample# | Crude Glycerin | Flowback Water | Tap Water |
|---|---|---|---|
| 1 | 30% | — | 70% |
| 2 | 30% | 55% | 15% |
| 3 | 30% | 58% | 12% |

The results determined the critical pitting potential for each solution and are reported in Table 2.

TABLE 2

Critical Pitting Potentials

| Sample# | Critical Pitting Potential (mV) |
|---|---|
| 1 | 373 |
| 2 | 414 |
| 3 | 394 |

Immersion Testing

Next non-welded mild steel steel coupons were tested for corrosion against each sample. The testing was performed at 130° F. for 28 days and for 84 days. All coupons tested were 3" length by 0.5" wide by 1/16" thick with a 3/16" diameter hole located 1/4" from one end.

They were double disk ground to 120 grit finish. They were stamped with a serial number for identification. The coupons were cleaned in acetone and then weighed before testing. They were then visual and microscopically analyzed and any surface irregularities. Any irregularity was photographed for comparison after testing.

For each metallurgy, solution and time, three coupons were attached to a PTFE holder. One coupon was held horizontally and two coupons held vertically for each test. The coupons and holder were then placed in a 32 oz. glass bottle. Approximately 14 oz. of the solution was added to the glass bottle. The horizontal coupon was fully immersed in the solution, reported as liquid phase. One vertical coupon was partially submerged with half in the product and half in the head space, reported as interface phase. The final vertical coupon was fully in the vapor space, reported as vapor phase. The bottle was then capped and placed in a calibrated oven at 130° F. for the set amount of time. In total eighteen coupons were immersed in six different bottles.

After testing, all coupons were rinsed in acetone and then cleaned in an inhibited acid solution of concentrated hydrochloric acid, stannous chloride and antimony trioxide for 1 minute. They were then moved to a water and sodium bicarbonate solution for 1 minute. Then they were moved and immersed in DI water for 1 minute. Finally they were immersed in acetone for 1 minute and dried. Three non-exposed coupons went through the cleaning process and all three showed a weight loss of 0.0002 grams.

After exposure and cleaning, the coupons were weighed again so that a weight loss could be determined. The 0.0002 grams from the cleaning method was removed from the weight loss for the coupons, to account for the weight loss due to cleaning. A corrosion rate was then calculated. A visual and microscopic examination was performed to determine if there were any signs of localized attack on all coupons. If localized attack was seen, a calibrated pit depth microscope would be used to determine the maximum pit depth seen in testing. Results for each solution and time are reported in Table 3.

TABLE 3

Non-Welded Mild Steel Immersion Test

| Sample# | Exposure Time (Days) | Phase | Corrosion Rate (mpy) | Visible Pitting |
|---|---|---|---|---|
| 1 | 28 | Liquid | 6.5 | Significant |
| 1 | 28 | Interface | ? | Significant |
| 1 | 28 | Vapor | 1.7 | Significant |
| 1 | 84 | Liquid | 4.7 | Significant |
| 1 | 84 | Interface | ? | Significant |
| 1 | 84 | Vapor | 2.1 | Significant |
| 2 | 28 | Liquid | 6.1 | Significant |
| 2 | 28 | Interface | ? | Significant |
| 2 | 28 | Vapor | 2.3 | Significant |
| 2 | 84 | Liquid | 4.7 | Significant |
| 2 | 84 | Interface | ? | Significant |
| 2 | 84 | Vapor | 3.1 | Significant |
| 3 | 28 | Liquid | 3.7 | Significant |
| 3 | 28 | Interface | ? | Significant |
| 3 | 28 | Vapor | 1.2 | Significant |
| 3 | 84 | Liquid | 4.3 | Significant |
| 3 | 84 | Interface | ? | Significant |
| 3 | 84 | Vapor | 2.1 | Significant |

The data demonstrates that a crude glycerin-PTFP composition, even though it has significantly more salt content imposes far less corrosion on mild steel, a form of steel highly susceptible to corrosion. As a result use of this material allows for effective freeze conditioning without an undo tradeoff in corrosion of iron bearing handling equipment such but not limited to rail cars, chutes, slides, shovels, hoppers, conduits, hatches, channels, and the like that the freeze conditioning agent would come into contact with.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of inhibiting the agglomeration of a particulate material exposed to below freezing temperature, the method comprising the step of applying to the particulate material a fluid comprising flow back water and/or produced water, and crude glycerin.

2. The method of claim 1 wherein the crude glycerin comprises bottom stream.

3. The method of claim 1 wherein the fluid is essentially flow back water.

4. The method of claim 1 wherein the fluid is essentially produced water.

5. The method of claim 1 wherein the fluid and crude glycerin are pre-mixed before contacting the particulate material.

6. The method of claim 1 wherein the fluid and crude glycerin do not contact each other until after they are applied to the particulate material.

7. The method of claim 1 in which the dosage of crude glycerin in the presence of the below freezing temperature would be insufficient to prevent the agglomeration of the particulate material but for the presence of the fluid.

8. The method of claim 1, wherein the fluid comprises at least one item selected from the group consisting of: hydrochloric acid, acetic acid, formic acid, 2,2-dibromo-3-nitrilopropionamide, polycyclic organic matter, polynuclear aromatic hydrocarbons, glutaraldehyde, diammonium peroxidisulfate, ammonium persulfate, ammonium sulfate, ethylene glycol, glycol ethers, tetramethyl ammonium chloride, potassium chloride, methanol, propargyl alcohol, boric acid, monoethanolamine, polyacrylamide, sodium acrylate-acrylamide copolymer, guar gum, citric acid, thioglycolic acid, diesel, benzene, toluene, ethylbenzene, xylene, naphthalene, sand, ceramic beads, ammonium chloride, polyacrylate, methanol, isopropanol, peracid, biocide, breaker, clay stabilizer, corrosion inhibitor, crosslinker, friction reducer, gelling agent, iron control agent, linear gel carrier fluid, proppant, scale inhibitor, surfactant, and any combination thereof.

9. The method of claim 1, wherein the fluid comprises at least one item selected from the group consisting of: chloride, strontium, barium, boron, chromium, selenium, lead, arsenic, radium-226, heavy metals, methane, alkali metals, alkaline earth metals, anionic ions, cationic ions, dispersed rock, and any combination thereof.

10. The method of claim 1 wherein the fluid and crude glycerin is distributed throughout a pile of particulate material.

11. The method of claim 1 in which the ratio of fluid relative to crude glycerin is within range of from 1:99 to 99:1.

12. The method of claim 1 in which either or both of the fluid and the crude glycerin comprise at least one salt in an amount sufficient to induce corrosion on an iron comprising object in contact with the particulate material but the salt will not induce such corrosion.

13. A method of inhibiting the agglomeration of a particulate material exposed to below freezing temperature, the method comprising the step of applying to the particulate material a fluid comprising flow back water and/or produced water, and crude glycerin.

* * * * *